United States Patent [19]

Okano et al.

[11] Patent Number: 5,648,170

[45] Date of Patent: Jul. 15, 1997

[54] COATED GRANULAR MAGNETITE PARTICLES AND PROCESS FOR PRODUCING THE SAME

[75] Inventors: Yoji Okano, Hiroshima; Eiichi Kurita, Yokohama; Kazuo Fujioka; Koso Aoki, both of Hiroshima; Hiromitsu Misawa, Hatsukaichi; Minoru Kozawa, Higashi-Hiroshima, all of Japan

[73] Assignee: Toda Kogyo Corporation, Japan

[21] Appl. No.: 230,405

[22] Filed: Apr. 20, 1994

[30] Foreign Application Priority Data

Apr. 27, 1993 [JP] Japan ................................. 5-125208
Apr. 27, 1993 [JP] Japan ................................. 5-125209

[51] Int. Cl.$^6$ ........................................................ B32B 5/16
[52] U.S. Cl. .................. 428/403; 252/62.56; 252/62.58; 252/62.59; 428/694 BA; 428/701; 428/702; 428/900
[58] Field of Search ............................ 428/403, 694 BA, 428/694 BH, 699, 701, 762, 900; 252/62.56, 62.58, 62.59

[56] References Cited

U.S. PATENT DOCUMENTS

| | | | |
|---|---|---|---|
| 4,082,905 | 4/1978 | Stephan et al. | 428/538 |
| 4,390,361 | 6/1983 | Sueyoshi et al. | 75/0.5 BA |
| 5,314,750 | 5/1994 | Takedoi et al. | 428/402 |
| 5,449,565 | 9/1995 | Aoki et al. | 428/694 |

FOREIGN PATENT DOCUMENTS

| | | |
|---|---|---|
| 0376033 | 7/1990 | European Pat. Off. . |
| 0400556 | 12/1990 | European Pat. Off. . |
| 0555056 | 8/1993 | European Pat. Off. . |
| 4128563A1 | 3/1993 | Germany . |
| 54-7292 | 4/1979 | Japan . |
| 55-65406 | 5/1980 | Japan . |
| 60-117259 | 6/1985 | Japan . |
| 60-165703 | 8/1985 | Japan . |
| 3-67265 | 3/1991 | Japan . |
| 3-48505 | 7/1991 | Japan . |
| 631008 | 10/1949 | United Kingdom . |

*Primary Examiner*—H. Thi Le
*Attorney, Agent, or Firm*—Nixon & Vanderhye

[57] ABSTRACT

The disclosure describes coated granular magnetite particles comprising:

granular magnetite particle as a core, and $M_xFe_{2+y}O_z$ as a surface layer, wherein M is Zn or Co, $0.4 \leq x \leq 1$, $x+y=1$, and $4.0 \leq z \leq 4.3$, the amount of M in said $M_xFe_{2+y}O_z$ being 0.5 to 6 mol % based on the total Fe content in said granular magnetite particle as a core; and a process for producing the coated granular magnetite particles.

8 Claims, No Drawings

COATED GRANULAR MAGNETITE PARTICLES AND PROCESS FOR PRODUCING THE SAME

BACKGROUND OF THE INVENTION

The present invention relates to coated granular magnetite particles and a process for producing the same. More particularly, the present invention relates to granular magnetite particles coated with $M_xFe_{2+y}O_z$ (wherein M is Zn or Co, $0.4 \leq x \leq 1$, $x+y=1$, and $4 \leq z \leq 4.3$), which have an excellent heat resistance and a high tinting strength, and a process for producing the same.

Coated granular magnetite particles according to the present invention are chiefly intended as materials for coloring pigments for coating materials, printing inks and resins, and materials for magnetic toners and magnetic carriers.

Since granular magnetite particles are black, they are widely used as materials for a black coloring pigment which is dispersed in a vehicle or mixed with a resin.

In addition, since granular magnetite particles are black ferrimagnetic particles, they are mixed with and dispersed in a resin so as to produce composite particles which are also widely used as a particle material for magnetic toners and magnetic carriers for electrostatic copying.

When granular magnetite particles are used as a material for a black coloring pigment, if the granular magnetite particles have too high a coercive force, the magnetic reagglomeration is produced among particles, which makes the dispersion of the particles in a vehicle or a resin difficult. From the point of view of dispersibility, granular magnetite particles are required to have a coercive force of not more than about 300 Oe.

When granular magnetite particles are used as a material for a magnetic toner, (1) it is preferable that the granular magnetite particles have a high coercive force in order to improve the carrying property and the fluidity of the magnetic toner, but in order to improve the dispersibility of the magnetic particles and the turbulence of the magnetic toner, to activate the contact, separation and the friction between the magnetic particles and between the magnetic particles and the sleeve of a developing equipment, and to improve the developing property, the coercive force thereof must be not more than about 300 Oe.

(2) On the other hand, when used as a material for a magnetic toner, in order to prevent the reduction in the image density in continuous copying and to ameliorate defective development such as a part of image missing, the coercive force of the granular magnetite particles is preferably as low as possible, particularly not more than 150 Oe.

As described above, granular magnetite particles are widely used as materials for a black coloring pigment. Since they are often exposed to a high temperature of not lower than 150° C., particularly not lower than 200° C., they are required to keep a stable tone at a temperature of not lower than 150° C., particularly not lower than 200° C. (this property is referred to as "heat resistance" hereinunder).

This fact is described in Japanese Patent Publication (KOKOKU) No. 54-7292 (1979) as "... When the pigment is used as a coloring agent for a thermoplastic resin such as polyethylene, polypropylene, polystyrene and ABS, since these thermoplastic resins are formed and processed at a temperature as high as approximately more than 200° C., especially a yellow iron oxide pigment is not immune to discoloring, so that the uses thereof are limited. ..." and in Japanese Patent Application Laid-Open (KOKAI) No. 55-65406 (1980) as "Such magnetic powder for a one component magnetic toner is generally required to have the following properties. ... iv) To have a blackness which stands practical use. Although it is possible to add a coloring agent to the magnetic toner, it is preferable that the magnetic powder itself has a black color and that no coloring agent is used. v) To have a high heat resistance. It is necessary that the tone, particularly the blackness and the electromagnetic characteristics are sufficiently stable in a temperature range of 0° to about 150° C. ..."

The blackness of granular magnetite particles depends upon the $Fe^{2+}$ content and is apt to become higher with the increase in the $Fe^{2+}$ content. The phenomenon of the tone of the granular magnetite particles changing from black to brown is caused by the oxidation of $Fe^{2+}$ in the granular magnetite particles into $Fe^{3+}$, thereby transforming the granular magnetite particles into maghemite particles when the granular magnetite particles are exposed to a temperature as high as 150° C., especially to a temperature of about 200° C.

Furthermore, since if it is possible to color with a small amount of granular magnetite particles, it is advantageous in resources-saving and energy-saving as well as the operability such as handling property, granular magnetite particles are required to maintain the blackness before heating as much as possible so as to have a high tinting strength.

Granular magnetite particles are conventionally produced by what is called a wet-process which comprises the steps of: blowing an oxygen-containing gas into a suspension containing $Fe(OH)_2$ colloids or Fe-containing precipitates which are obtained by adding an aqueous ferrous salt solution to an aqueous alkali solution such as an aqueous alkali hydroxide solution and an aqueous alkali carbonate solution.

Various attempts have been made to improve the properties of granular magnetite particles. For example, there are known a method of coating granular magnetite particles with an insoluble inorganic compound such as zinc hydroxide, zinc phosphate, zinc phosphite, aluminum phosphate and silica (U.S. Pat. No. 4,082,905), a method of coating granular magnetite particles with a ferrite containing 1.5 to 13 mol % of a divalent metal other than Fe (Japanese Patent Application Laid-Open (KOKAI) No. 3-67265 (1991)), and a method of coprecipitating an oxide of Zn, Mn, Ni, Co, Mg, Cu or Cd at the time of producing granular magnetite particles (Japanese Patent Publication (KOKOKU) No. 3-48505 (1991)).

More specifically, U.S. Pat. No. 4,082,905 discloses an $Fe_3O_4$ iron oxide black pigment having incorporated therein up to about 50 mole percent of $\gamma\text{-}Fe2O_3$ plus $MeFe_2O_4$ (wherein Me is at least one of magnesium, manganese, cobalt, nickel, aluminum, chromium, titanium, copper, zinc and cadmium) having a specific surface according to BET of greater than about 12 m²/g, up to about 10% by weight of a substantially insoluble inorganic compound as coating and a stability to oxidation with air under standardized conditions of greater than about 130° C.

Japanese Patent Application Laid-Open (KOKAI) No. 3-67265 (1991) discloses a magnetic toner for developing a electrostatic image, comprising at least a binder resin and a spherical magnetic powder containing spherical magnetic particles, the spherical magnetic particles having a surface layer composed of a different composition from the core portion, and the surface layer being composed of a ferrite containing 1.5 to 13 mol % (calculated as divalent metal ions) of an oxide of a divalent metal other than iron.

Japanese Patent Publication No. 3-48505 (1991) discloses a magnetic toner for developing an electrostatic latent image, comprising a binder resin and a magnetic powder as the main ingredients, the magnetic powder being produced by a wet-process and containing an oxide of Zn, Mn, Ni, Co, Mg, Cu or Cd coprecipitated in the process of production.

As one of improving methods of various properties of the magnetic particles, "an acicular ferromagnetic iron oxide particles for a magnetic recording medium, comprising Co-coated γ-$Fe_2O_3$ particles as a core and an iron oxide layer containing zinc and a ferrous formed on the surfaces of Co-coated γ-$Fe_2O_3$ particles" is known in the field of a magnetic particles for magnetic recording, as disclosed in Japanese Patent Application Laid-Open (KOKAI) No. 60-165703 (1985). However, a method of coating magnetite particles with zinc and/or cobalt ferrite has not yet been proposed in the field of a pigment.

Granular magnetite particles having as low a coercive force as possible, particularly a coercive force of not more than 300 Oe and yet having high heat resistance and tinting strength are in the strongest demand at present, but the granular magnetite particles obtained in any of the above-described methods have poor heat resistance and tinting strength, although they have a coercive force which is as low as 40 to 130 Oe.

These granular magnetite particles begin to transform into maghemite particles at a temperature of about 130° C., and the color changes from black to liver brown, so that the tinting strength is low, as shown in the comparative examples which will be described later.

Although the particles described in U.S. Pat. No. 4,082,905 have an improved heat resistance, it cannot be said to be satisfactory.

In the particles described in Japanese Patent Application Laid-Open (KOKAI) No. 3-67265 (1991), the amount of charge can be controlled, but the heat resistance is not improved, and the particles begin to transform into maghemite particles at a temperature of about 140° C., as shown in Comparative Example 4 which will be described later. That is, the particles have a poor heat resistance.

The granular magnetite particles described in Japanese Patent Publication Nos. 59-43408 (1984) and 3-48505 (1991) are not the particles with improved heat resistance and tinting strength which are aimed at by the present invention.

The above-described the coating of the acicular magnetic particles with zinc ferrite (Japanese Patent Application Laid-Open (KOKAI) No. 60-165703 (1985)) in the field of magnetic recording are to improve the saturation magnetization and the change of the saturation magnetization with passage of time in response to the demand for high-density recording, but the improvement of heat resistance and tinting strength which are aimed at by the present invention, is not the target at all. Actually, these particles have a low heat resistance and begin to transform into maghemite particles at a temperature of about 120° to 145° C., as shown in the comparative examples which will be described later.

As to the charging property of the particles, it is preferable that the magnetic particles are positively charged in the case of a positive charge toner or that the magnetic particles are negatively charged in the case of a negative charge toner, as described in Japanese Patent Application Laid-Open (KOKAI) No. 60-117259 (1985) as "On the other hand, it is necessary that the toner is adjusted so as to be positively or negatively charged depending on the kind of a photosensitive material. Magnetic particles such as magnetite particles have a property of negatively charging. When such magnetic particles are used for a magnetic toner provided with a positive charging property, the phenomenon that a positively charged portion and a negatively charged portion coexist on the surface of one toner particle or the charging properties are different in toner particles, may be produced due to the existence of the magnetic particles exposed on the surface of the toner. This phenomenon is supposed to be one cause of abnormality in the image copying properties under some circumstance in a one component developing system using a magnetic toner. It is, therefore, expected that the magnetic particles in the toner are positive charge particles."

It is also preferred that the amount of charge of the toner is adjusted in an appropriate range so as to fit a developing equipment. For this purpose, the amount of charge of the whole magnetic particles is adjusted to an adequate amount.

As a result of various studies undertaken by the present inventors so as to achieve the above-described problems in the related art, it has been found that by dispersing granular magnetic particles to be treated in an aqueous dispersion, adding and mixing 1.0 to 39 mol % (calculated as $Fe^{2+}$ and based on the total amount of Fe in granular magnetite particles to be treated in the aqueous dispersion) of an aqueous ferrous salt solution, 0.5 to 6.0 mol % (calculated as M and based on the total amount of Fe in the granular magnetite particles to be treated) of an aqueous M salt solution and an aqueous alkali hydroxide to and with the obtained aqueous dispersion in a non-oxidizing atmosphere, thereby adjusting the concentration of the OH group in the dispersion to 0.3 to 1.0 mol/l, and blowing an oxygen-containing gas into the aqueous dispersion at a temperature of not lower than 50° C., the obtained granular magnetite particles coated with $M_xFe_{2+y}O_z$ (wherein M is Zn or Co, $0.4 \leq x \leq 1$, x+y=1, and $4.0 \leq z \leq 4.3$), have the change ratio (%) in the $Fe^{2+}$ content of not more than 8% and the change in the hue of not more than 0.8 after heating the coated granular magnetite particles at a temperature of 200° C. for 1 hour, and show black and a very excellent heat resistance. The present invention has been achieved on the basis of this finding.

SUMMARY OF THE INVENTION

It is an object of the present invention to provide coated granular magnetite particles which have a low coercive force, especially a coercive force of not more than 300 Oe, an excellent heat resistance and a high tinting strength.

It is another object of the present invention to provide coated granular magnetite particles in which the change ratio (%) in the $Fe^{2+}$ content of not more than 8% and the change in the hue of not more than 0.8 after heating the coated granular magnetite particles at a temperature of 200° C. for 1 hour, and which have a high black coloring power.

It is still another object of the present invention to provide coated granular magnetite particles which have a preferred amount of charge.

To achieve these aims, in a first aspect of the present invention, there are provided coated granular magnetite particles comprising: as a core granular magnetite particle, and as a surface layer $M_xFe_{2+y}O_z$ (wherein M is Zn or Co, $0.4 \leq x \leq 1$, x+y=1, and $4.0 \leq z \leq 4.3$), the amount of M in $M_xFe_{2+y}O_z$ being 0.5 to 6 mol % based on the total Fe content in the granular magnetite particle.

In a second aspect of the present invention, there are provided coated granular magnetite particles comprising:

granular magnetite particle as a core; and $Zn_xFe_{2+y}O_z$ as a surface layer, wherein $0.4 \leq x \leq 1$, $x+y=1$, and $4.0 \leq z \leq 4.3$, the amount of Zn in said $Zn_xFe_{2+y}O_z$ being 0.5 to 4.0 mol % based on the total Fe content in said granular magnetite particle as a core.

In a third aspect of the present invention, there are provided coated granular magnetite particles comprising:

granular magnetite particle as a core; and $Co_xFe_{2+y}O_z$ as a surface layer, wherein $0.4 \leq x \leq 1$, $x+y=1$, and $4.0 \leq z \leq 4.3$, the amount of Co in said $Co_xFe_{2+y}O_z$ being 1.0 to 6.0 mol % based on the total Fe content in said granular magnetite particle as a core.

In a fourth aspect of the present invention, there are provided coated granular magnetite particles comprising:

granular magnetite particle as a core;

$Zn_xFe_{2+y}O_z$ as a surface layer, wherein $0.4 \leq x \leq 1$, $x+y=1$, and $4.0 \leq z \leq 4.3$, the amount of Zn in said $Zn_xFe_{2+y}O_z$ being 0.5 to 4.0 mol % based on the total Fe content in said granular magnetite particle as a core; and a coating layer formed on said $Zn_xFe_{2+y}O_z$ surface layer, and composed of a precipitate of a hydroxide, a oxyhydroxide oxide or a mixture thereof of at least one element selected from the group consisting of Si, Al and Ti, the amount of said precipitate being 0.1 to 5 wt % (calculated as Si, Al and/or Ti) based on said coated granular magnetite particle.

In a fifth aspect of the present invention, there are provided coated granular magnetite particles comprising:

granular magnetite particle as a core;

$Co_xFe_{2+y}O_z$ as a surface layer, wherein $0.4 \leq x \leq 1$, $x+y=1$, and $4.0 \leq z \leq 4.3$, the amount of Co in said $Co_xFe_{2+y}O_z$ being 1.0 to 6 mol % based on the total Fe content in said granular magnetite particle as a core; and a coating layer formed on said $Zn_xFe_{2+y}O_z$ surface layer, and composed of a precipitate of a hydroxide, a oxyhydroxide oxide or a mixture thereof of at least one element selected from the group consisting of Si, Al and Ti, the amount of said precipitate being 0.1 to 5 wt % (calculated as Si, Al and/or Ti) based on said coated granular magnetite particle.

In a sixth aspect of the present invention, there is provided a process for producing coated granular magnetite particles comprising the steps of:

dispersing granular magnetite particles to be treated in an aqueous dispersion;

adding and mixing 1.0 to 39 mol % of an aqueous ferrous salt solution (calculated as $Fe^{2+}$ and based on the total amount of Fe in said granular magnetite particles to be treated in said aqueous dispersion), 0.5 to 6 mol % of an aqueous M salt solution (calculated as M and based on the total amount of Fe in said granular magnetite particles to be treated) and an aqueous alkali hydroxide solution to and with said aqueous dispersion in a non-oxidizing atmosphere, thereby adjusting the concentration of the OH group in said aqueous dispersion to 0.3 to 1.0 mol/l; and blowing an oxygen-containing gas into said aqueous dispersion at a temperature of not lower than 50° C. to coat the surfaces of said granular magnetite particles to be treated with $M_xFe_{2+y}O_z$, wherein M is Zn or Co, $0.4 \leq x \leq 1$, $x+y=1$, and $4.0 \leq z \leq 4.3$.

In a seventh aspect of the present invention, there is provided a process for producing coated granular magnetite particles comprising the steps of:

dispersing granular magnetite particles to be treated in an aqueous dispersion;

adding and mixing 1.0 to 39 mol % of an aqueous ferrous salt solution (calculated as $Fe^{2+}$ and based on the total amount of Fe in said granular magnetite particles to be treated in said aqueous dispersion), 0.5 to 6 mol % of an aqueous M salt solution (calculated as M and based on the total amount of Fe in said granular magnetite particles to be treated) and an aqueous alkali hydroxide solution to and with said aqueous dispersion in a non-oxidizing atmosphere, thereby adjusting the concentration of the OH group in said aqueous dispersion to 0.3 to 1.0 mol/l;

blowing an oxygen-containing gas into said aqueous dispersion at a temperature of not lower than 50° C. to coat the surfaces of said granular magnetite particles to be treated with $M_xFe_{2+y}O_z$, wherein M is Zn or Co, $0.4 \leq x \leq 1$, $x+y=1$, and $4.0 \leq z \leq 4.3$;

adding at least one compound selected from the group consisting of an Si compound, an Al compound and a Ti compound to the resultant aqueous dispersion after said granular magnetite particles to be treated are coated with said $M_xFe_{2+y}O_z$ layer; and adjusting the pH of the resultant aqueous dispersion to 5 to 9 to coat each of said $M_xFe_{2+y}O_z$ layers with a precipitate of a hydroxide, a oxyhydroxide or a mixture thereof of at least one element selected from the group consisting of Si, Al and Ti.

DETAILED DESCRIPTION OF THE INVENTION

The granular magnetite particles to be treated (to be coated) used in the present invention are black particles containing 12 to 24 wt % of $Fe^{2+}$, which are obtained by a wet-process. The particle shape of the granular magnetite particles to be treated is not restricted, and the particles may be, for example, spherical, cubic or octahedral. The particle size of the granular magnetite particles to be treated is preferably in the range of 0.1 to 0.5 μm and a BET specific surface area thereof is in the range of 3 to 15 m²/g with consideration for the dispersibility of the particles.

The granular magnetite particles to be treated containing 12 to 24 wt % of $Fe^{2+}$ are ordinarily black, but in order to produce the target particles which have a more excellent blackness and a higher tinting strength, it is preferable to use granular magnetite particles to be treated containing a larger amount of $Fe^{2+}$, particularly not less than 14 wt %, more preferably not less than 17 wt % of $Fe^{2+}$.

The surface layer is composed of $M_xFe_{2+y}O_z$ (wherein M is Zn or Co, $0.4 \leq x \leq 1$, $x+y=1$, and $4 \leq z \leq 4.3$). If x is less than 0.4, the heat-resistance improving-effect is insufficient, and the exothermic reaction initiating-temperature is lowered. On the other hand, if x exceeds 1.0, the M ions which do not contribute to the production of the coating material unfavorably singly separate out in the form of fine $M(OH)_2$ particles.

The amount of M in $M_xFe_{2+y}O_z$ is 0.5 to 6 mol % based on the total Fe content in the granular magnetite particles to be treated. If the amount of M is less than 0.5 mol %, the improvement of the heat resistance is insufficient, and the exothermic reaction initiating-temperature is lowered. If it exceeds 6 mol %, the heat resistance is improved, but the coercive force sometimes unfavorably exceeds 300 Oe.

When M is Co, the Co content in $Co_xFe_{2+y}O_z$ is preferably 1 to 6 mol %, more preferably 2 to 6 mol % based on the total Fe content in the granular magnetite particles to be treated.

When M is Zn, the Zn content in $Zn_xFe_{2+y}O_z$ is preferably 0.5 to 4 mol %, more preferably 1 to 4 mol % based on the total Fe content in the granular magnetite particles to be treated.

There is a tendency of the heat resistance of the coated granular magnetite particles being improved and the coercive force thereof being increased as the amount of M in $M_xFe_{2+y}O_z$ increases and the value of x approaches 1.

The Fe content in $M_xFe_{2+y}O_z$ may be an amount which is necessary for producing $M_xFe_{2+y}O_z$, preferably 1 to 39 mol % based on the total Fe content in the granular magnetite particles to be treated.

The coated granular magnetite particles of the present invention are produced by:

(a) dispersing granular magnetite particles to be treated in an aqueous dispersion;

(b) adding and mixing 1.0 to 39 mol % (calculated as $Fe^{2+}$ and based on the total amount of Fe in the granular magnetite particles to be treated in the aqueous dispersion) of an aqueous ferrous salt solution, 0.5 to 6 mol % (calculated as M and based on the total amount of Fe in the granular magnetite particles to be treated) of an aqueous M salt solution, and an aqueous alkali hydroxide solution, to and with said aqueous dispersion in a non-oxidizing atmosphere to adjust the concentration of the OH group in said aqueous dispersion to 0.3 to 1.0 mol/l; and (c) blowing an oxygen-containing gas into the resultant dispersion at a temperature of not lower than 50° C., preferably not lower than 70° C.

Further, the order of the addition of the aqueous ferrous salt solution, the aqueous M salt solution and the aqueous alkali hydroxide solution is not specified.

When M is Co, the amount of aqueous cobalt salt solution is preferably 1 to 6 mol %, more preferably 2 to 6 mol % (calculated as Co) based on the total amount of Fe in the granular magnetite particles to be treated. The amount of aqueous ferrous salt solution may be an amount which is necessary for producing $Co_xFe_{2+y}O_z$. It is preferably 2 to 39 mol %, more preferably 4 to 39 mol % (calculated as $Fe^{2+}$) based on the total Fe content in the granular magnetite particles to be treated.

When M is Zn, the amount of aqueous zinc salt is preferably 0.5 to 4.0 mol %, more preferably 1 to 4 mol % (calculated as Zn) based on the total amount of Fe in the granular magnetite particles to be treated. The amount of aqueous ferrous salt may be the minimum which is necessary for producing $Zn_xFe_{2+y}O_z$. It is preferably 1.0 to 26 mol %, more preferably 2.0 to 26 mol % (calculated as $Fe^{2+}$) based on the total Fe content in the granular magnetite particles to be treated.

The atmosphere in which an aqueous ferrous salt solution, an aqueous M salt solution and an aqueous alkali hydroxide solution are added to and mixed with the aqueous dispersion containing the granular magnetite particles to be treated, is a non-oxidizing atmosphere. In order to produce a non-oxidizing atmosphere, nitrogen gas or the like is blown into the reaction vessel. If the atmosphere is not a non-oxidizing atmosphere, $M_xFe_{2+y}O_z$ does not sufficiently grow on the surfaces of the granular magnetite particles to be treated and fine $M_xFe_{2+y}O_z$ particles singly separate out.

As the aqueous ferrous salt solution used in the present invention, ferrous sulfate, ferrous chloride, etc. are usable.

As the aqueous cobalt salt solution used in the present invention, cobalt sulfate, cobalt chloride, cobalt hydroxide, etc. are usable.

As the aqueous zinc salt solution used in the present invention, zinc sulfate, zinc chloride, zinc nitrate, zinc phosphate etc. are usable.

As the alkali hydroxide solution used in the present invention, sodium hydroxide, potassium hydroxide, etc. are usable.

The amount of alkali hydroxide solution is adjusted so that the concentration of the OH group in the dispersion is 0.3 to 1.0 mol/l, preferably 0.5 to 1.0 mol/l. If the concentration of the OH group is less than 0.3 mol/l, $M_xFe_{2+y}O_z$ does not sufficiently grow on the surfaces of the granular magnetite particles and fine $M_xFe_{2+y}O_z$ particles singly separate out. In order to grow $M_xFe_{2+y}O_z$ on the surfaces of the granular magnetite particles to be treated, 1.0 mol/l of alkali hydroxide solution is enough as the concentration of the OH group in the dispersion.

As the oxygen-containing gas used in the present invention, air is optimal.

The oxidation temperature in the present invention is not lower than 50° C., preferably not lower than 70° C., more preferably 70° to 100° C. If the temperature is lower than 50° C., a whole amount of the added ferrous salt does not contribute to the production of the zinc ferrite coating layer and/or cobalt ferrite coating layer, and acicular goethite particles or acicular lepidcrocite particles are produced from a part of the added ferrous salt and are contaminated with the coated granular magnetite particles.

Thus obtained coated granular magnetite particles according to the present invention have an average particle diameter of 0.1 to 0.5 μm.

The coated granular magnetite particles of the present invention include the coated granular magnetite particles each of whose $M_xFe_{2+y}O_z$ layer of the coated granular magnetite particles obtained by the above-mentioned method, is coated with a coprecipitate of a hydroxide and/or a hydroxide oxide of at least one element selected from the group consisting of Si, Al and Ti.

The amount of coprecipitate of the hydroxide and/or hydroxide oxide thereof is 0.1 to 5 wt %, preferably 0.1 to 4 wt % (calculated as Si, Al and/or Ti) based on the coated granular magnetite particles.

The coprecipitate layers are formed on the surface of the $M_xFe_{2+y}O_z$ layer by adding an Si compound, an Al compound and/or Ti compound to the suspension containing the suspended particles after the $M_xFe_{2+y}O_z$ layers are formed, in other words, after the surfaces of the granular magnetite particles are coated with $M_xFe_{2+y}O_z$ by blowing an oxygen-containing gas into the dispersion at a temperature of not lower than 50° C.; and adjusting the pH of the resultant aqueous dispersion to 5 to 9, preferably 6 to 8.

Examples of the Si compound used in the present invention are water glass #3 (an aqueous solution of sodium silicate), sodium silicate and potassium silicate.

Examples of the Al compound used in the present invention are aluminum sulfate, aluminum chloride, aluminum nitrate and sodium aluminate.

Examples of the Ti compound used in the present invention are titanyl sulfate and titanium chloride.

The amount of Si compound, Al compound and/or Ti compound added to the reaction system is 0.1 to 5.0 wt %, preferably 0.1 to 4 wt % (calculated as Si, Al and/or Ti) based on the coated granular magnetite particles.

In order to adjust the pH of the aqueous dispersion containing the Si compound, the Al compound and/or the Ti compound to 5 to 9, an acid (such as sulfuric acid, hydrochloric acid, nitric acid, etc.) or a base (such as sodium hydroxide, potassium hydroxide, etc.) is added as occasion demands.

What is the most important in the present invention is the fact that when granular magnetic particles to be treated are dispersed in an aqueous dispersion; 1.0 to 39 mol % (calculated as $Fe^{2+}$ and based on the total amount of Fe in the granular magnetite particles to be treated in the aqueous dispersion) of an aqueous ferrous salt solution, 0.5 to 6 mol % (calculated as M and based on the total amount of Fe in the granular magnetite particles to be treated) of an aqueous M salt solution and an aqueous alkali hydroxide solution are added to and mixed with said aqueous dispersion in a non-oxidizing atmosphere to adjust the concentration of the OH group in said aqueous dispersion to 0.3 to 1.0 mol/l, or 1.0 to 39 mol % (calculated as $Fe^{2+}$ and based on the total amount of Fe in the granular magnetite particles to be treated in the aqueous dispersion) of an aqueous dispersion and 0.6 to 6.0 mol % (calculated as M and based on the total amount of Fe in the granular magnetite particles to be treated) of an aqueous M salt solution are added to and mixed with the obtained aqueous dispersion in a non-oxidizing atmosphere, and the concentration of the OH group in the resultant dispersion is adjusted to 0.3 to 1.0 mol/l, preferably 0.5 to 1.0 mol/l by adding an aqueous alkali hydroxide solution in a non-oxidizing atmosphere; and an oxygen-containing gas is blown into the dispersion at a temperature of not lower than 50° C., it is possible to obtain the granular magnetite particles coated with $M_xFe_{2+y}O_z$ (wherein M is Zn or Co, $0.4 \leq x \leq 1$, $x+y=1$, and $4.0 \leq z \leq 4.3$), the amount of M being 0.5 to 6 mol % based on the total Fe content in the granular magnetite particles to be treated, and the coated granular magnetite particles obtained having a coercive force of not more than 300 Oe and excellent heat resistance and tinting strength.

The mechanism of improving the above-described properties of the coated granular magnetite particles of the present invention has not been theoretically elucidated. However, since coated granular magnetite particles having various properties aimed at by the present invention have not been obtained when the atmosphere in which an aqueous ferrous salt, an aqueous M salt and an aqueous alkali hydroxide are added to and mixed with the obtained aqueous dispersion containing the granular magnetite particles to be treated is an oxidizing atmosphere, or when the concentration of the OH group is out of the range of 0.3 to 1.0 mol/l, as shown in comparative examples which will be described later, it is considered that a uniform and dense $M_xFe_{2+y}O_z$ layer is formed on the surface of the granular magnetite particle to be treated due to the synergistic effect of the non-oxidizing atmosphere which controls the oxidation reaction so as to enable a uniform oxidation in the reaction system and the adjustment of the concentration of the OH group to a specific range to lower the solubility of the hydroxide, thereby suppressing the separation of a new nucleus crystal, and that the uniform and dense $M_xFe_{2+y}O_z$ layers contribute to the improvement of the properties of the granular magnetite particles.

The exothermic reaction initiating-temperature of the coated granular magnetite particles of the present invention was not lower than 150° C., preferably not lower than 200° C., as is shown in examples which will be described later. The change ratio (%) in the $Fe^{2+}$ content was not more than 8%, preferably not more than 6.5%, more preferably not more than 6.0% after heating the granular magnetite particles even at a temperature as high as 200° C. for 1 hour. That is, the $Fe^{2+}$ content before heating was approximately maintained. As a result, ΔE (change of the hue) was not more than 0.8, preferably not more than 0.65, more preferably not more than 0.60. It was also confirmed that the blackness was sufficiently maintained and the heat resistance was excellent.

The BET specific surface area of the coated granular magnetite particles of the present invention is not more than 15 $m^2/g$, preferably 3 to 15 $m^2/g$; the coercive force is generally not more than 300 Oe, especially, when M is Co, the coercive force is preferably 150 to 300 Oe, more preferably 170 to 300 Oe, and when M is Zn, the coercive force is preferably not more than 150 Oe, more preferably 30 to 150 Oe; the residual magnetization and the saturation magnetization are not more than 28 emu/g and not less than 80 emu/g, respectively; when M is Co, the residual magnetization is 15 to 28 emu/g, more preferably 18 to 28 emu/g, and when M is Zn, the residual magnetization is not more than 15 emu/g, more preferably 2 to 15 emu/g.

If the coated granular magnetite particles with the $M_xFe_{2+y}O_z$ layers coated with precipitates of a hydroxide and/or a hydroxide oxide of at least one element selected from the group consisting of Si, Al and Ti are used for a magnetic toner, the surface of the magnetic toner is uniformly charged, the amount of charge is in the range of −50 to 15 μc/g, and the heat resistance is further improved.

The coated granular magnetite particles according to the present invention have an excellent heat resistance and a high tinting strength, so that they are suitable as materials for coloring pigments for coating materials, printing inks and resins, and materials for magnetic toners and magnetic carriers.

EXAMPLES

The present invention will be explained in more detail hereinunder with reference to the following examples and comparative examples. The average particle diameter in the examples and comparative examples were expressed by the values measured by a BET method.

The Co content and the Fe content in the particles were expressed by the values measured by a high-frequency plasma emission spectrophotometer ICAP-575 (manufactured by Nihon Jarrel Ash Co., Ltd).

The magnetic characteristics of the particles were measured under an external magnetic field of 10 KOe by an vibration sample magnetometer VSM-3S-15 (manufactured by Toei Kogyo Co., Ltd).

The heat resistance of the particles was expressed by the exothermic reaction initiating-temperature (°C.) measured by differential thermal analysis using a differential scanning calorimeter DSC-200 (manufactured by Seiko Instruments and Electronics, Ltd.).

The change ratio (%) in the $Fe^{2+}$ content after heating the granular magnetite particles at a temperature of 200° C. for 1 hour was measured.

The $L_1*$ value, the $a_1*$ value, and the $b_1*$ value before heating and the $L_2*$ value, the $a_2*$ value, and the $b_2*$ value after heating were measured so as to express the change in the hue by the following formula:

$$\Delta E = (L_2^* - L_1^*)^2 + (a_2^* - a_1^*)^2 + (b_2^* - b_1^*)^2$$

The hue was expressed by the L* value (lightness), the a* value and the b* value. These values were measured in the Hunter's Lab space by using a light-source spectrophotometric colorimeter MSC-1S-2D (manufactured by Suga Testing Machine, Ltd.), and expressed in accordance with the uniform perceived color space determined by Commission Internationale de l'Exlairage, 1976.

The test piece for measuring the hue was obtained by kneading 0.5 g of the coated granular magnetite particles and 0.5 cc of castor oil in the form of a paste by a Hoover muller, adding a clear lacquer to the paste and kneading the mixture so as to produce a coating material, and applying the coating material onto a cast-coated paper by using a 6-mil applicator.

Example 1

0.24 mol of a $ZnSO_4$ solution, 0.50 mol of an $FeSO_4$ solution and 37.0 mol of an aqueous NaOH solution were added to a dispersion of 90° C. which was obtained by dispersing 1856 g of octahedral magnetite particles (average particle diameter: 0.26 μm, coercive force: 120 Oe, BET specific surface area: 5.5 m²/g, $Fe^{2+}$ content: 20.1 wt %) produced from an aqueous solution (by wet-process) into water, while blowing $N_2$ gas into the dispersion at a rate of 20 liter/min, so that the total content was 39.5 liter. The $Zn^{2+}$ content and the $Fe^{2+}$ content in the obtained dispersion were 1.00 mol % and 2.09 mol %, respectively, based on the total Fe content in the granular magnetite particles, and the concentration of the OH group was 0.94 mol/liter.

Thereafter, air was blown into the resultant dispersion in place of the $N_2$ gas at a rate of 100 liter/min, while the resultant dispersion was stirred at a temperature of 90° C. for 20 minutes, thereby coating the granular magnetite particles with zinc ferrite. The black precipitates obtained were filtered out, washed with water and dried at a temperature of 60° C. to obtain black particles.

As a result of the measurement and the composition analysis of Zn and Fe by the method which will be described in the following, the composition of the surfaces of the obtained black particles was represented by the general formula $Zn_xFe_{2+y}O_z$, wherein X=0.97 and 2+y=2.03, and the Zn content in the $Zn_xFe_{2+y}O_z$ layer was 1.0 mol % based on the total Fe content in the black particles to be treated and the Fe content in the coating material was 2.1 mol % based on the total Fe content in the black particles to be treated. The BET specific surface area of the obtained black particles was 4.9 m²/g and the $Fe^{2+}$ content thereof was 20.5 wt %. As to the magnetic characteristics of the obtained black particles, the coercive force (Hc) was 124 Oe, the residual magnetization ($\sigma_r$) was 12.8 emu/g, and the saturation magnetization ($\sigma_s$) was 85.4 emu/g.

The exothermic reaction initiating-temperature measured from differential thermal analysis was 219° C. In other words, the coated granular magnetite particles was excellent in heat resistance. The $Fe^{2+}$ content after heating the granular magnetite particles at a temperature of 200° C. for 60 minutes was 19.6 wt %. Since the $Fe^{2+}$ content before heating was 20.5 wt %, the change ratio (%) in the $Fe^{2+}$ content was as small as 4.4%. The granular magnetite particles assumed a bluish black color, and the tinting strength was excellent. ΔE was 0.42.

For the composition analysis, 10 g of the obtained black particles were suspended in 100 ml of water, and the resultant suspension was heated to 60° C. in a reaction vessel. Thereafter, 200 ml of 1-N HCl solution was added to the suspension under stirring so as to measure the Zn content and the Fe content. Six test samples were prepared and were taken out one after another t=0, 1, 5, 10, 30, 60, and 120 minutes after the addition of the HCl solution to analyze the Zn content and the Fe content in the filtrate obtained by filtering out the black particles.

Examples 2 to 10, Comparative Examples 1 to 4

The coated granular magnetite particles were obtained in the same manner as in Example 1 except for varying the kind of the granular magnetite particles, the kinds and the amounts of aqueous zinc salt solution, aqueous ferrous salt solution and aqueous NaOH solution in the mixing process, and the temperature in the oxidation process.

The main producing conditions and the properties of the coated granular magnetite particles obtained are shown in Tables 1 to 3.

Example 11

0.84 mol of a $COSO_4$ solution, 1.77 mol of an $FeSO_4$ solution and 37.0 mol of an aqueous NaOH solution were added to a dispersion of 90° C. which was obtained by dispersing 1856 g of octahedral magnetite particles (average particle diameter: 0.25 μm, BET specific surface area: 6.3 m²/g $Fe^{2+}$ content: 20.2 wt %) produced from an aqueous solution (by wet-process) into water, while blowing $N_2$ gas into the dispersion at a rate of 20 liter/min, so that the total content was 41.0 liter. The Co content and the $Fe^{2+}$ content in the obtained dispersion were 3.5 mol % and 7.35 mol %, respectively, based on the total Fe content in the granular magnetite particles, and the concentration of the OH group was 0.90 mol/liter.

Thereafter, air was blown into the resultant dispersion in place of the $N_2$ gas at a rate of 100 liter/min, while the resultant dispersion was stirred at a temperature of 90° C. for 20 minutes, thereby coating the granular magnetite particles with cobalt ferrite. The black precipitates obtained were filtered out, washed with water and dried at a temperature of 60° C. to obtain black particles.

As a result of the measurement and the composition analysis of Co and Fe by the method which will be described in the following, the composition of the surfaces of the obtained black particles was represented by the general formula $Co_xFe_{2+y}O_z$, wherein x=0.97 and 2+y=2.03, and the Co content in the coating material was 3.5 mol % based on the total Fe content in the black particles to be treated and the Fe content in the $Co_xFe_{2+y}O_z$ layer was 7.3 mol % based on the total Fe content in the black particles to be treated. The BET specific surface area of the obtained black particles was 5.9 m²/g and the $Fe^{2+}$ content was 20.5 wt %. As to the magnetic characteristics of the obtained black particles, the coercive force (Hc) was 198 Oe, the residual magnetization ($\sigma_r$) was 20.4 emu/g, and the saturation magnetization ($\sigma_s$) was 85.6 emu/g.

The exothermic reaction initiating-temperature measured from differential thermal analysis was 250° C. In other words, the coated granular magnetite particles exhibited excellent heat resistance. The $Fe^{2+}$ content after heating the granular magnetite particles at a temperature of 200° C. for 60 minutes was 19.7 wt %. Since the $Fe^{2+}$ content before heating was 20.5 wt %, the change ratio (%) in the $Fe^{2+}$ content was as small as 3.9 %. The granular magnetite particles assumed a bluish black color, and the tinting strength was excellent. ΔE was 0.44.

For the composition analysis, 10 g of the obtained black particles were suspended in 100 ml of water, and the resultant suspension was heated to 60° C. in a reaction vessel. Thereafter, 200 ml of 1-N HCl solution was added to the suspension under stirring so as to measure the Co content and the Fe content. Six test samples were prepared and were taken out one after another t=0, 1, 5, 10, 30, 60, and 120 minutes after the addition of the HCl solution to analyze the Co content and the Fe content in the filtrate obtained by filtering out the black particles.

Examples 12 to 20, Comparative Examples 5 to 8

The coated granular magnetite particles were obtained in the same manner as in Example 11 except for varying the kind of the granular magnetite particles, the kinds and the amounts of aqueous cobalt salt solution, aqueous ferrous salt solution and aqueous NaOH solution in the mixing process, and the temperature in the oxidation process.

The main producing conditions and the properties of the coated granular magnetite particles obtained are shown in Tables 4 to 6.

Comparative Examples 2 and 6 were the same manner as Example 1 except that the mixing process was conducted in air without blowing $N_2$ gas. It was observed through an electron microscope that fine zinc ferrite particles (Comparative Example 2) and fine cobalt ferrite particles (Comparative Example 6) singly separated out in the coated particles obtained together with the octahedral magnetite particles. Similarly, in Comparative Examples 3 and 7, it was confirmed from observation through an electron microscope that fine zinc ferrite particles (Comparative Example 3) and fine cobalt ferrite particles (Comparative Example 7) singly separated out in the coated particles obtained together with the octahedral magnetite particles.

Example 21

After 1 kg of the magnetite particles coated with zinc ferrite obtained in Example 1 were dispersed in water of 80° C., 14.8 g of water glass #3, which was 0.2 wt % (calculated as Si) based on the said zinc ferrite coated particles, was added to the obtained dispersion and the resultant dispersion was stirred for 10 minutes. Sulfuric acid was added dropwise to the dispersion so as to adjust the pH to 5.5, and the resultant dispersion was stirred for 15 minutes. The black precipitates obtained were filtered out, washed with water and dried at a temperature of 60° C. to obtain black particles.

As a result of the following fluorescent X-ray analysis, it was found that the black particles contained 0.19 wt % of Si. The amount of charge measured by the following method was −21 µC/g.

The fluorescent X-ray analysis was conducted in accordance with JIS-K-0119 "General rule for fluorescent X-ray analysis" by using Fluorescent X-ray Analyzer Model 3063M (manufactured by Rigaku Denki Kogyo Co., Ltd).

The amount of charge was measured by using a blow-off charge amount measuring apparatus (manufactured by Toshiba Chemical Co., Ltd) after 30-minutes' friction between the particles and an iron powder carrier of TEFV-200/300 (produced by Nihon Teppun Co., Ltd).

Examples 22 to 23

The Si-coated magnetite particles were obtained in the same manner as in Example 21 except for varying the kind and the amount of Si compound and the pH of the dispersion.

The producing conditions and the properties of the Si-coated magnetite particles are shown in Table 7.

Example 24

After 1 kg of the magnetite particles coated with zinc ferrite obtained in Example 9 were dispersed in water of 65° C., an aqueous NaOH solution was added dropwise to the obtained dispersion under stirring so as to adjust the pH to 11. Thereafter, an aqueous solution containing 12.7 g of $Al_2(SO_4)_3$, which was 0.2 wt % (calculated as Al) based on the said zinc ferrite coated particles, was added dropwise to the dispersion and the resultant dispersion was stirred for 10 minutes. Sulfuric acid was then added dropwise to the dispersion so as to adjust the pH to 7.5, and the resultant dispersion was stirred for 15 minutes. The black precipitates obtained were filtered out, washed with water and dried at 60° C. to obtain black particles.

The black particles contained 0.19 wt % of Al and the amount of charge measured was −5 µC/g.

Examples 25 and 26

The Al-coated magnetite particles were obtained in the same manner as in Example 24 except for varying the kind and the amount of Al compound and the pH of the dispersion.

The producing conditions and the properties of the Al-coated magnetite particles are shown in Table 7.

After 1 kg of the magnetite particles coated with cobalt ferrite obtained in Example 16 were dispersed in water of 70° C., an aqueous solution containing 18.4 g of $TiOSO_4$-$2H_2O$, which was 0.45 wt % (calculated as Ti) based on the said cobalt ferrite coated particles, and an aqueous NaOH solution were simultaneously added dropwise to the obtained dispersion while maintaining the pH at 7.0. The resultant dispersion was stirred for 15 minutes. The black precipitates obtained were filtered out, washed with water and dried at a temperature of 60° C. to obtain black particles.

The black particles contained 0.42 wt % of Ti and the amount of charge measured was −23 µC/g.

Examples 28 and 29

The Ti-coated magnetite particles were obtained in the same manner as in Example 27 except for varying the kind and the amount of Ti compound and the pH of the dispersion.

The producing conditions and the properties of the Ti-coated magnetite particles are shown in Table 7.

Example 30

After 1 kg of the magnetite particles coated with cobalt ferrite obtained in Example 19 were dispersed in water of 75° C., an aqueous NaOH solution was added dropwise to the dispersion under stirring so as to adjust the pH to 11. Thereafter an aqueous solution containing 18.5 g of water glass #3, which was 0.25 wt % (calculated as Si) based on the said cobalt ferrite coated particles, and an aqueous solution containing 28.5 g of $Al_2(SO_4)_3$, which was 0.45 wt % (calculated as Al) based on the the said cobalt ferrite coated particles, were added dropwise to the obtained dispersion and the resultant dispersion was stirred for 10 minutes. Sulfuric acid was then added dropwise to the dispersion so as to adjust the pH to 8.5, and the resultant dispersion was stirred for 15 minutes. The black precipitates obtained were filtered out, washed with water and dried at a temperature of 60° C. to obtain black particles.

The black particles contained 0.25 wt % of Si and 0.41 wt % of Al, and the amount of charge measured was −14 µC/g.

Examples 31 and 32

The Si- and Al-coated magnetite particles were obtained in the same manner as in Example 30 except for varying the kinds and the amounts of Si compound and Al compound and the pH of the dispersion.

The producing conditions and the properties of the Si and Al-coated magnetite particles are shown in Table 7.

TABLE 1

| | | Zinc ferrite coating process | | | | | |
|---|---|---|---|---|---|---|---|
| | | Mixing process | | | | | |
| | | Aqueous zinc salt solution | | | Aqueous ferrous salt solution | | |
| Examples | Kind of granular magnetite particles | Kind | Amount added (mol) | Zn/ total Fe (mol %) | Kind | Amount added (mol) | $Fe^{2+}$/ total Fe (mol %) |
|---|---|---|---|---|---|---|---|
| Ex. 1 | Octahedral magnetite particles [Hc = 120 Oe, BET = 5.5 m²/g $Fe^{2+}$ = 20.1 wt %] | $ZnSO_4$ | 0.24 | 1.00 | $FeSO_4$ | 0.50 | 2.09 |
| Ex. 2 | Octahedral magnetite particles [Hc = 140 Oe, BET = 9.8 m²/g $Fe^{2+}$ = 18.9 wt %] | $ZnSO_4$ | 0.48 | 2.00 | $FeSO_4$ | 1.01 | 4.19 |
| Ex. 3 | Hexahedral magnetite particles [Hc = 100 Oe, BET = 7.5 m²/g $Fe^{2+}$ = 18.6 wt %] | $ZnSO_4$ | 0.72 | 3.00 | $FeSO_4$ | 1.51 | 6.28 |
| Ex. 4 | Hexahedral magnetite particles [Hc = 98 Oe, BET = 7.1 m²/g $Fe^{2+}$ = 19.2 wt %] | $ZnSO_4$ | 0.84 | 3.50 | $FeSO_4$ | 1.76 | 7.33 |
| Ex. 5 | Spherical magnetite particles [Hc = 55 Oe, BET = 6.9 m²/g $Fe^{2+}$ = 17.2 wt %] | $Zn(NO_3)_2$ | 0.24 | 1.00 | $FeSO_4$ | 0.72 | 3.00 |
| Ex. 6 | Spherical magnetite particles [Hc = 56 Oe, BET = 7.0 m²/g $Fe^{2+}$ = 17.4 wt %] | $Zn(NO_3)_2$ | 0.48 | 2.00 | $FeSO_4$ | 1.44 | 6.00 |
| Ex. 7 | Octahedral magnetite particles [Hc = 102 Oe, BET = 4.9 m²/g $Fe^{2+}$ = 18.8 wt %] | $Zn(NO_3)_2$ | 0.72 | 3.00 | $FeSO_4$ | 2.16 | 9.00 |
| Ex. 8 | Octahedral magnetite particles [Hc = 120 Oe, BET = 5.5 m²/g $Fe^{2+}$ = 19.4 wt %] | $Zn(NO_3)_2$ | 0.24 | 1.00 | $FeSO_4$ | 1.20 | 5.00 |

| | Zinc ferrite coating process | | | | | |
|---|---|---|---|---|---|---|
| | Mixing process | | | | | |
| | Aqueous NaOH solution Amount added (mol) | Concentration of OH group (mol/l) | Oxidation process Temperature (°C.) | Surface layer | | |
| | | | | Composition | | Zn content (mol %) | Total Fe content (mol %) |
| | | | | X | 2 + y | | |
|---|---|---|---|---|---|---|---|
| Ex. 1 | 37.0 | 0.94 | 90 | 0.97 | 2.03 | 1.0 | 2.1 |
| Ex. 2 | 33.3 | 0.84 | 80 | 0.97 | 2.03 | 2.0 | 4.2 |
| Ex. 3 | 29.6 | 0.74 | 80 | 0.97 | 2.03 | 3.0 | 6.3 |
| Ex. 4 | 25.9 | 0.65 | 90 | 0.97 | 2.03 | 3.5 | 7.3 |

TABLE 1-continued

| | | | | | | | |
|---|---|---|---|---|---|---|---|
| Ex. 5 | 37.0 | 0.93 | 70 | 0.75 | 2.25 | 1.0 | 3.0 |
| Ex. 6 | 37.0 | 0.92 | 70 | 0.75 | 2.25 | 2.0 | 6.0 |
| Ex. 7 | 38.9 | 0.95 | 60 | 0.75 | 2.25 | 3.0 | 9.0 |
| Ex. 8 | 14.8 | 0.38 | 80 | 0.50 | 2.50 | 1.0 | 5.0 |

TABLE 2

| | | Zinc ferrite coating process | | | | |
|---|---|---|---|---|---|---|
| | | Mixing process | | | | |
| Examples | | Aqueous zinc salt solution | | | Aqueous ferrous salt solution | |
| and Comparative Examples | Kind of granular magnetite particles | Kind | Amount added (mol) | Zn/ total Fe (mol %) | Kind | Amount added (mol) | $Fe^{2+}$/ total Fe (mol %) |
| Ex. 9 | Octahedral magnetite particles [Hc = 132 Oe, BET = 7.3 $m^2$/g $Fe^{2+}$ = 19.9 wt %] | $ZnSO_4$ | 0.48 | 2.00 | $FeSO_4$ | 1.92 | 8.00 |
| Ex. 10 | Octahedral magnetite particles [Hc = 146 Oe, BET = 10.2 $m^2$/g $Fe^{2+}$ = 20.2 wt %] | $ZnSO_4$ | 0.72 | 3.00 | $FeSO_4$ | 2.89 | 12.00 |
| Comp. Ex. 1 | Acicular magnetite particles [Hc = 120 Oe, BET = 5.5 $m^2$/g $Fe^{2+}$ = 17.9 wt %] | $ZnSO_4$ | 0.72 | 3.00 | $FeSO_4$ | 1.51 | 6.28 |
| Comp. Ex. 2 | Octahedral magnetite particles [Hc = 405 Oe, BET = 33.0 $m^2$/g $Fe^{2+}$ = 20.3 wt %] | $ZnSO_4$ | 0.24 | 1.00 | $FeSO_4$ | 0.50 | 2.09 |
| Comp. Ex. 3 | Octahedral magnetite particles [Hc = 102 Oe, BET = 4.9 $m^2$/g $Fe^{2+}$ = 19.6 wt %] | $ZnSO_4$ | 0.72 | 3.00 | $FeSO_4$ | 2.16 | 9.00 |
| Comp. Ex. 4 | Hexahedral magnetite particles [Hc = 99 Oe, BET = 7.7 $m^2$/g $Fe^{2+}$ = 18.7 wt %] | $ZnSO_4$ | 0.07 | 0.30 | $FeSO_4$ | 1.01 | 4.20 |

| | Zinc ferrite coating process | | | | | |
|---|---|---|---|---|---|---|
| | Mixing process | | | | | |
| | Aqueous NaOH solution Amount added (mol) | Concentration of OH group (mol/l) | Oxidation process Temperature (°C.) | Surface layer | | |
| | | | | Composition | | Zn content (mol %) | Total Fe content (mol %) |
| | | | | X | 2 + y | | |
| Ex. 9 | 25.9 | 0.65 | 90 | 0.60 | 2.40 | 2.0 | 8.0 |
| Ex. 10 | 37.0 | 0.89 | 90 | 0.60 | 2.40 | 3.0 | 12.0 |
| Comp. Ex. 1 | 37.0 | 0.91 | 90 | 0.97 | 2.03 | 3.0 | 6.3 |
| Comp. Ex. 2 | 37.0 | 0.94 | 90 | — | — | — | — |

TABLE 2-continued

| | | | | | | | |
|---|---|---|---|---|---|---|---|
| Comp. Ex. 3 | 7.4 | 0.19 | 80 | — | — | — | — |
| Comp. Ex. 4 | 29.6 | 0.75 | 80 | 0.20 | 2.80 | 0.3 | 4.2 |

TABLE 3

| | Granular magnetite particles coated with zinc ferrite | | | | | | Heated granular magnetite particles | | |
|---|---|---|---|---|---|---|---|---|---|
| | | | | | | | | $Fe^{2+}$ | |
| Examples and Comparative Examples | BET specific surface area ($m^2/g$) | $Fe^{2+}$ content (wt %) | Coercive force Hc (Oe) | Residual magnetization $\sigma_r$ (emu/g) | Saturation magnetization $\sigma_s$ (emu/g) | Exothermic reaction initiating temperature (°C.) | Content (wt %) | Change ratio (%) | ΔE |
| Ex. 1 | 4.9 | 20.5 | 124 | 12.8 | 85.4 | 219 | 19.6 | 4.4 | 0.42 |
| Ex. 2 | 9.1 | 20.8 | 141 | 14.3 | 85.1 | 297 | 20.1 | 3.4 | 0.33 |
| Ex. 3 | 6.7 | 20.8 | 103 | 9.9 | 84.5 | 315 | 20.1 | 3.4 | 0.31 |
| Ex. 4 | 5.9 | 21.3 | 100 | 9.9 | 84.1 | 327 | 20.7 | 2.8 | 0.28 |
| Ex. 5 | 6.5 | 20.4 | 58 | 4.8 | 86.1 | 182 | 19.9 | 2.5 | 0.52 |
| Ex. 6 | 6.2 | 20.4 | 60 | 5.2 | 85.5 | 226 | 19.6 | 3.9 | 0.45 |
| Ex. 7 | 4.2 | 20.7 | 117 | 10.9 | 85.3 | 270 | 19.9 | 3.9 | 0.33 |
| Ex. 8 | 5.3 | 20.3 | 125 | 12.6 | 85.9 | 170 | 19.2 | 5.4 | 0.54 |
| Ex. 9 | 6.7 | 20.1 | 133 | 13.1 | 86.2 | 201 | 19.3 | 4.0 | 0.47 |
| Ex. 10 | 9.8 | 20.5 | 146 | 14.2 | 86.0 | 240 | 19.7 | 3.9 | 0.39 |
| Comp. Ex. 1 | 30.0 | 17.1 | 700 | 40.9 | 85.3 | 145 | 10.1 | 40.9 | 1.39 |
| Comp. Ex. 2 | — | — | — | — | — | — | — | — | — |
| Comp. Ex. 3 | — | — | — | — | — | — | — | — | — |
| Comp. Ex. 4 | 7.5 | 18.1 | 104 | 10.1 | 84.1 | 142 | 15.3 | 15.5 | 1.03 |

TABLE 4

| | | Cobalt ferrite coating process | | | | | |
|---|---|---|---|---|---|---|---|
| | | Mixing process | | | | | |
| | | Aqueous cobalt salt solution | | | Aqueous ferrous salt solution | | |
| Examples | Kind of granular magnetite particles | Kind | Amount added (mol) | Co/ total Fe (mol %) | Kind | Amount added (mol) | $Fe^{2+}$/ total Fe (mol %) |
| Ex. 11 | Octahedral [Hc = 122 Oe, BET = 6.3 $m^2/g$ $Fe^{2+}$ = 20.2 wt %] | $CoSO_4$ | 0.84 | 3.5 | $FeSO_4$ | 1.77 | 7.33 |
| Ex. 12 | Octahedral magnetite particles [Hc = 101 Oe, BET = 5.1 $m^2/g$ $Fe^{2+}$ = 19.1 wt %] | $CoSO_4$ | 1.08 | 4.5 | $FeSO_4$ | 2.27 | 9.42 |
| Ex. 13 | Hexahedral magnetite particles [Hc = 97 Oe, BET = 7.5 $m^2/g$ $Fe^{2+}$ = 18.7 wt %] | $CoSO_4$ | 1.32 | 5.5 | $FeSO_4$ | 2.77 | 11.51 |

TABLE 4-continued

| | | | | | | | |
|---|---|---|---|---|---|---|---|
| Ex. 14 | Octahedral magnetite particles [Hc = 143 Oe, BET = 8.7 m²/g $Fe^{2+}$ = 18.6 wt %] | $CoCl_2$ | 0.96 | 4.0 | $FeSO_4$ | 2.65 | 11.00 |
| Ex. 15 | Octahedral magnetite particles [Hc = 154 Oe, BET = 10.7 m²/g $Fe^{2+}$ = 19.6 wt %] | $CoCl_2$ | 1.20 | 5.0 | $FeSO_4$ | 3.31 | 13.75 |
| Ex. 16 | Spherical magnetite particles [Hc = 56 Oe, BET = 7.0 m²/g $Fe^{2+}$ = 16.0 wt %] | $CoCl_2$ | 1.32 | 5.5 | $FeSO_4$ | 3.64 | 15.13 |
| Ex. 17 | Spherical magnetite particles [Hc = 58 Oe, BET = 7.2 m²/g $Fe^{2+}$ = 15.8 wt %] | $CoSO_4$ | 1.20 | 5.0 | $FeSO_4$ | 3.95 | 16.43 |
| Ex. 18 | Octahedral magnetite particles [Hc = 118 Oe, BET = 6.2 m²/g $Fe^{2+}$ = 19.2 wt %] | $CoSO_4$ | 0.60 | 2.5 | $FeSO_4$ | 1.98 | 8.22 |

| | Cobalt ferrite coating process | | | | | | |
|---|---|---|---|---|---|---|---|
| | Mixing process | | | | | | |
| | Aqueous NaOH solution Amount added (mol) | Concentration of OH group (mol/l) | Oxidation process Temperature (°C.) | Surface layer | | | |
| | | | | Composition | | Co content (mol %) | Total Fe content (mol %) |
| | | | | X | 2 + y | | |
| Ex. 11 | 37.0 | 0.90 | 90 | 0.97 | 2.03 | 3.5 | 7.3 |
| Ex. 12 | 29.6 | 0.72 | 90 | 0.97 | 2.03 | 4.5 | 9.4 |
| Ex. 13 | 22.2 | 0.54 | 80 | 0.97 | 2.03 | 5.5 | 11.5 |
| Ex. 14 | 37.0 | 0.89 | 70 | 0.80 | 2.20 | 4.0 | 11.0 |
| Ex. 15 | 40.7 | 0.96 | 80 | 0.80 | 2.20 | 5.0 | 13.8 |
| Ex. 16 | 18.5 | 0.44 | 90 | 0.80 | 2.20 | 5.5 | 15.1 |
| Ex. 17 | 42.6 | 0.99 | 60 | 0.70 | 2.30 | 5.0 | 16.4 |
| Ex. 18 | 14.8 | 0.37 | 90 | 0.70 | 2.30 | 2.5 | 8.2 |

TABLE 5

| | | Cobalt ferrite coating process | | | | | |
|---|---|---|---|---|---|---|---|
| | | Mixing process | | | | | |
| | | Aqueous cobalt salt solution | | | Aqueous ferrous salt solution | | |
| Examples and Comparative Examples | Kind of granular magnetite particles | Kind | Amount added (mol) | Co/ total Fe (mol %) | Kind | Amount added (mol) | $Fe^{2+}$/ total Fe (mol %) |
| Ex. 19 | Hexahedral magnetite particles [Hc = 99 Oe, BET = 7.7 m²/g $Fe^{2+}$ = 18.5 wt %] | $CoSO_4$ | 0.72 | 3.0 | $FeSO_4$ | 3.21 | 13.36 |
| Ex. 20 | Spherical magnetite | $CoSO_4$ | 0.96 | 4.0 | $FeSO_4$ | 4.81 | 20.00 |

TABLE 5-continued

| | | | | | | | |
|---|---|---|---|---|---|---|---|
| | particles<br>[Hc = 58 Oe,<br>BET = 7.3 m²/g<br>Fe²⁺ = 16.8 wt %] | | | | | | |
| Comp.<br>Ex. 5 | Acicular<br>magnetite<br>particles<br>[Hc = 401 Oe,<br>BET = 32 m²/g<br>Fe²⁺ = 18.3 wt %] | CoSO₄ | 0.72 | 3.0 | FeSO₄ | 1.51 | 6.28 |
| Comp.<br>Ex. 6 | Octahedral<br>magnetite<br>particles<br>[Hc = 122 Oe,<br>BET = 6.3 m²/g<br>Fe²⁺ = 20.2 wt %] | CoSO₄ | 0.84 | 3.5 | FeSO₄ | 1.77 | 7.33 |
| Comp.<br>Ex. 7 | Octahedral<br>magnetite<br>particles<br>[Hc = 118 Oe,<br>BET = 6.2 m²/g<br>Fe²⁺ = 19.2 wt %] | CoSO₄ | 0.60 | 2.5 | FeSO₄ | 1.98 | 8.22 |
| Comp.<br>Ex. 8 | Hexahedral<br>magnetite<br>particles<br>[Hc = 99 Oe,<br>BET = 7.7 m²/g<br>Fe²⁺ = 18.5 wt %] | CoSO₄ | 0.19 | 0.8 | FeSO₄ | 1.73 | 7.20 |

| | Cobalt ferrite coating process | | | | | |
|---|---|---|---|---|---|---|
| | Mixing process | | | | | |
| | Aqueous<br>NaOH | Concen- | Oxidation | Surface layer | | |
| | solution<br>Amount<br>added | tration<br>of OH<br>group | process<br>Tempera-<br>ture | Composition | | Co<br>content | Total<br>Fe<br>content |
| | (mol) | (mol/l) | (°C.) | X | 2 + y | (mol %) | (mol %) |
| Ex. 19 | 29.6 | 0.71 | 90 | 0.55 | 2.45 | 3.0 | 13.4 |
| Ex. 20 | 37.0 | 0.86 | 55 | 0.50 | 2.50 | 4.0 | 20.0 |
| Comp.<br>Ex. 5 | 37.0 | 0.91 | 90 | 0.97 | 2.03 | 3.0 | 6.3 |
| Comp.<br>Ex. 6 | 37.0 | 0.90 | 90 | — | — | — | — |
| Comp.<br>Ex. 7 | 7.4 | 0.18 | 90 | — | — | — | — |
| Comp.<br>Ex. 8 | 29.6 | 0.74 | 80 | 0.30 | 2.70 | 0.8 | 7.2 |

TABLE 6

Granular magnetite particles coated with cobalt ferrite

| Examples<br>and<br>Compara-<br>tive<br>Examples | BET<br>specific<br>surface<br>area<br>(m²/g) | Fe²⁺<br>content<br>(wt %) | Coer-<br>cive<br>force<br>Hc<br>(Oe) | Residual<br>magneti-<br>zation<br>σᵣ<br>(emu/g) | Satura-<br>tion<br>magneti-<br>zation<br>σₛ<br>(emu/g) | Exother-<br>mic<br>reaction<br>initia-<br>ting<br>tempera-<br>ture<br>(°C.) |
|---|---|---|---|---|---|---|
| Ex. 11 | 5.9 | 20.5 | 198 | 20.4 | 85.6 | 250 |
| Ex. 12 | 4.3 | 20.6 | 232 | 24.3 | 85.6 | 270 |
| Ex. 13 | 6.4 | 20.4 | 296 | 27.1 | 85.1 | 301 |
| Ex. 14 | 8.2 | 20.5 | 179 | 19.5 | 85.5 | 219 |
| Ex. 15 | 10.1 | 20.8 | 237 | 24.8 | 85.8 | 229 |
| Ex. 16 | 6.0 | 21.0 | 260 | 26.5 | 86.4 | 243 |
| Ex. 17 | 6.8 | 20.6 | 202 | 21.3 | 85.4 | 221 |
| Ex. 18 | 5.9 | 20.3 | 165 | 18.1 | 85.2 | 181 |
| Ex. 19 | 7.3 | 20.7 | 163 | 17.9 | 85.8 | 172 |
| Ex. 20 | 7.0 | 20.9 | 169 | 18.3 | 86.1 | 197 |
| Comp.<br>Ex. 5 | 30.0 | 15.8 | 409 | 41.6 | 84.8 | 143 |
| Comp.<br>Ex. 6 | — | — | — | — | — | — |
| Comp.<br>Ex. 7 | — | — | — | — | — | — |
| Comp.<br>Ex. 8 | 7.4 | 17.9 | 128 | 13.1 | 84.1 | 139 |

TABLE 6-continued

| | Heated granular magnetite particles | | |
|---|---|---|---|
| | $Fe^{2+}$ | | |
| | Content (wt %) | Change ratio (%) | ΔE |
| Ex. 11 | 19.7 | 3.9 | 0.44 |
| Ex. 12 | 19.8 | 3.9 | 0.43 |
| Ex. 13 | 19.8 | 2.9 | 0.31 |
| Ex. 14 | 19.7 | 3.9 | 0.54 |
| Ex. 15 | 19.8 | 4.8 | 0.46 |
| Ex. 16 | 20.2 | 3.8 | 0.44 |
| Ex. 17 | 19.6 | 4.9 | 0.47 |
| Ex. 18 | 19.1 | 5.9 | 0.62 |
| Ex. 19 | 19.7 | 4.8 | 0.62 |
| Ex. 20 | 19.6 | 6.2 | 0.61 |
| Comp. Ex. 5 | 10.2 | 35.4 | 1.31 |
| Comp. Ex. 6 | — | — | — |
| Comp. Ex. 7 | — | — | — |
| Comp. Ex. 8 | 14.9 | 16.8 | 1.02 |

TABLE 7

| | | Si, Al, Ti coating process | | | Granular magnetite particles coated with Si, Al, Ti | |
|---|---|---|---|---|---|---|
| | | Coating material | | | BET specific | |
| Example | Ferrite coated particles | Kind | Amount added (wt %) | pH of dispersion | surface area (m²/g) | $Fe^{2+}$ content (wt %) |
| Ex. 21 | Ex. 1 | Water glass #3 | 0.2 | 5.5 | 5.0 | 20.3 |
| Ex. 22 | Ex. 1 | Water glass #3 | 3.0 | 8.5 | 5.9 | 20.0 |
| Ex. 23 | Ex. 1 | Potassium silicate | 5.0 | 8.5 | 7.3 | 19.6 |
| Ex. 24 | Ex. 9 | Aluminum sulfate | 0.2 | 7.5 | 6.9 | 20.0 |
| Ex. 25 | Ex. 9 | Aluminum sulfate | 1.5 | 7.5 | 7.8 | 19.8 |
| Ex. 26 | Ex. 9 | Aluminum sulfate | 6.5 | 7.0 | 9.4 | 18.6 |
| Ex. 27 | Ex. 16 | Titanyl sulfate | 0.45 | 7.0 | 6.2 | 20.9 |
| Ex. 28 | Ex. 16 | Titanyl sulfate | 3.0 | 7.5 | 6.6 | 20.4 |
| Ex. 29 | Ex. 16 | Titanium chloride | 4.5 | 8.0 | 8.9 | 20.0 |
| Ex. 30 | Ex. 19 | Water glass #3, Aluminum sulfate | 0.25 0.45 | 8.5 | 7.5 | 20.6 |
| Ex. 31 | Ex. 19 | Water glass #3, Aluminum sulfate | 2.5 2.5 | 6.5 | 9.3 | 19.8 |
| Ex. 32 | Ex. 19 | Potassium silicate, Aluminum sulfate | 5.0 5.0 | 7.0 | 10.7 | 19.0 |

TABLE 7-continued

| | Granular magnetite particles coated with Si, Al, Ti | | | | | |
|---|---|---|---|---|---|---|
| | Coercive force Hc (Oe) | Residual magnetization $\sigma_r$ (emu/g) | Saturation magnetization $\sigma_s$ (emu/g) | Exothermic reaction initiating temperature (°C.) | Content of coating material (wt %) | Amount of charge (μC/g) |
| Ex. 21 | 125 | 12.6 | 85.2 | 221 | Si = 0.19 | −21 |
| Ex. 22 | 124 | 12.4 | 83.2 | 232 | Si = 2.53 | −36 |
| Ex. 23 | 122 | 12.1 | 81.3 | 250 | Si = 4.47 | −43 |
| Ex. 24 | 133 | 13.1 | 86.0 | 209 | Al = 0.19 | −5 |
| Ex. 25 | 134 | 12.9 | 84.9 | 217 | Al = 1.18 | +5 |
| Ex. 26 | 132 | 12.1 | 80.9 | 232 | Al = 4.10 | +12 |
| Ex. 27 | 259 | 26.4 | 86.0 | 251 | Ti = 0.42 | −23 |
| Ex. 28 | 260 | 25.7 | 83.8 | 258 | Ti = 2.97 | −37 |
| Ex. 29 | 259 | 25.1 | 82.8 | 272 | Ti = 4.47 | −42 |
| Ex. 30 | 161 | 17.7 | 85.2 | 180 | Si = 0.25, Al = 0.41 | −14 |
| Ex. 31 | 162 | 17.1 | 82.0 | 206 | Si = 2.47, Al = 1.98 | −21 |
| Ex. 32 | 162 | 16.5 | 79.2 | 218 | Si = 4.50, Al = 4.01 | −21 |

| | Heated granular magnetite particles | | |
|---|---|---|---|
| | $Fe^{2+}$ | | |
| | Content (wt %) | Change ratio (%) | ΔE |
| Ex. 21 | 19.4 | 4.4 | 0.42 |
| Ex. 22 | 19.2 | 4.0 | 0.41 |
| Ex. 23 | 18.9 | 3.6 | 0.35 |
| Ex. 24 | 19.2 | 4.0 | 0.39 |
| Ex. 25 | 19.0 | 4.0 | 0.38 |
| Ex. 26 | 17.9 | 3.8 | 0.35 |
| Ex. 27 | 20.1 | 3.8 | 0.36 |
| Ex. 28 | 19.7 | 3.4 | 0.35 |
| Ex. 29 | 19.4 | 3.0 | 0.32 |
| Ex. 30 | 19.7 | 4.4 | 0.40 |
| Ex. 31 | 19.0 | 4.0 | 0.44 |
| Ex. 32 | 18.3 | 3.7 | 0.39 |

What is claimed is:

1. Coated granular magnetite particles having a BET specific surface area of not more than 15 m²/g, a coercive force of not more than 150 Oe, a residual magnetization of not more than 15 emu/g, a saturation magnetization of not less than 80 emu/g, a change ratio (%) in the $Fe^{2+}$ content of not more than 8% after heating said coated granular magnetite particles at a temperature of 200° C. for 1 hour, and a change in hue of not more than 0.8 after heating said coated granular magnetite particles at a temperature of 200° C. for 1 hour, said particles comprising:

granular magnetite core particles containing 12 to 24 wt % of $Fe^{2+}$ coated with at least one uniform surface coating layer comprising $Zn_xFe_{2+y}O_z$, wherein $0.4 \leq x \leq 1$, $x+y=1$, and $4.0 \leq z \leq 4.3$, and the amount of Zn is 0.5 to 4.0 mol % based on the total Fe content in said granular magnetite core particle.

2. Coated granular magnetite particles according to claim 1, wherein the BET specific surface area of said coated particles is 3 to 15 m²/g.

3. Coated granular magnetite particles according to claim 1, further comprising at least one coating layer formed on said $Zn_xFe_{2+y}O_z$ surface layers, said coating layer being composed of a precipitate of a hydroxide, an oxyhydroxide or a mixture thereof of at least one element selected from the group consisting of Si, Al and Ti and the amount of said precipitate being 0.1 to 5 wt %, calculated as Si, Al and/or Ti, based on said coated granular magnetite particles.

4. Coated granular magnetite particles according to claim 1, wherein the BET specific surface area of said granular magnetite core particles is 3 to 15 m$^2$/g.

5. Coated granular magnetite particles having a BET specific surface area of not more than 15 m$^2$/g, a coercive force of 150 to 300 Oe, a residual magnetization of 15 to 28 emu/g, a saturation magnetization of not less than 80 emu/g, a change ratio (%) in the Fe$^{2+}$ content of not more than 8% after heating said coated granular magnetite particles at a temperature of 200° C. for 1 hour, and a change in hue of not more than 0.8 after heating said coated granular magnetite particles at a temperature of 200° C. for 1 hour, said particles comprising:

granular magnetite core particles containing 12 to 24 wt % of Fe$^{2+}$ coated with at least one uniform surface coating layer comprising Co$_x$Fe$_{2+y}$O$_z$, wherein $0.4 \leq x \leq 1$, $x+y=1$, and $4.0 \leq z \leq 4.3$, and the amount of Co is 1.0 to 6.0 mol % based on the total Fe content in said granular magnetite core particles.

6. Coated granular magnetite particles according to claim 5, wherein the BET specific surface area of said coated particles is 3 to 15 m$^2$/g.

7. Coated granular magnetite particles according to claim 5, further comprising at least one coating layer formed on said Co$_x$Fe$_{2+y}$O$_z$ surface layers, said coating layer being composed of a precipitate of a hydroxide, an oxyhydroxide or a mixture thereof of at least one element selected from the group consisting of Si, Al and Ti, and the amount of said precipitate being 0.1 to 5 wt %, calculated as Si, Al and/or Ti, based on said coated granular magnetite particles.

8. Coated granular magnetite particles according to claim 5, wherein the BET specific surface area of said granular magnetite core particles is 3 to 15 m$^2$/g.

* * * * *